United States Patent [19]

Bonomo

[11] Patent Number: 5,661,922

[45] Date of Patent: Sep. 2, 1997

[54] FISHING SWIVEL WEED GUARD RESONATING SYSTEM

[76] Inventor: Louis James Bonomo, 118 W. 27th St., Apt. 2F, New York, N.Y. 10001

[21] Appl. No.: 433,038

[22] Filed: May 3, 1995

[51] Int. Cl.[6] .......................... A01K 85/01; A01K 85/02
[52] U.S. Cl. ...................... 43/42.31; 43/44.9; 43/43.2
[58] Field of Search ........................ 43/42.36, 42.15, 43/42.31, 44.9, 43.2

[56] References Cited

U.S. PATENT DOCUMENTS

| | | | |
|---|---|---|---|
| D. 331,788 | 12/1992 | Jensen | D22/126 |
| D. 349,941 | 8/1994 | Gentry | D22/126 |
| 2,140,724 | 12/1938 | Stefan | 43/44.9 |
| 2,241,367 | 5/1941 | Sarff | 43/42.1 |
| 3,200,531 | 8/1965 | Colbert | 43/41.2 |
| 3,309,811 | 3/1967 | Wimer | 43/42.06 |
| 3,686,787 | 8/1972 | Milovich | 43/44.9 |
| 3,705,465 | 12/1972 | Charney | 43/42.06 |
| 3,908,298 | 9/1975 | Strader | 43/42.31 X |
| 3,987,576 | 10/1976 | Strader | 43/42.31 X |
| 4,060,925 | 12/1977 | Bias | 43/41.2 |
| 4,145,833 | 3/1979 | Ratte | 43/44.89 |
| 4,617,753 | 10/1986 | Pauley et al. | 43/42.19 |
| 4,920,685 | 5/1990 | Landuydt | 43/42.04 |
| 4,995,189 | 2/1991 | Crihfield | 43/42.31 |
| 5,201,784 | 4/1993 | McWilliams | 43/42.31 |
| 5,319,876 | 6/1994 | Vlahek | 43/44.9 |
| 5,335,441 | 8/1994 | Blackwell | 43/42.36 |
| 5,347,744 | 9/1994 | Getschel | 43/42.36 |

Primary Examiner—Jeanne Elpel
Attorney, Agent, or Firm—Darby & Darby

[57] ABSTRACT

A weed guard resonating system for a fishing lure attached to a fishing line by a swivel, has a cone which slidably engages the fishing line to substantially enclose the swivel, thereby protecting the swivel from vegetation, such as weeds, algae and moss, which allows the swivel to rotate freely, and producing a first, substantially constant resonating sound. In an alternate embodiment, the system includes a sinker for slidably engaging the fishing line, the sinker positioned adjacent and intermittently engaging the cone, opposite the swivel, for producing a second resonating sound upon impact with the cone, as the lure is pulled through the water.

12 Claims, 1 Drawing Sheet

FISHING SWIVEL WEED GUARD RESONATING SYSTEM

FIELD OF THE INVENTION

This invention relates generally to a weed guard resonating system for a fishing lure attached to a fishing line by a swivel, and more particularly to a dual-function, streamlined weed guard resonating system having a cone which engages the fishing line to enclose the swivel, thereby protecting the swivel from vegetation, such as weeds, algae and moss, which eliminates line-weakening twist by allowing the swivel to rotate freely, and producing a substantially constant, first resonating sound within the cone and including, in the alternative, a dual-function streamlined sinker which intermittently engages the cone to produce a second resonating sound upon impact, while providing sufficient weight to allow the fishing lure to drop to the desired depth.

BACKGROUND OF THE INVENTION

There are a number of problems encountered when using an artificial fishing lure. The first problem is simply attracting fish to the artificial lure. It is believed that a moderate resonating sound produced near the lure attracts fish. However, conventional resonating systems are complex or cumbersome. For example, U.S. Pat. No. 4,995,189 to Cribfield, issued Feb. 26, 1991, discloses a relatively complex resonating system having a two piece plastic shell with a plurality of metal spheres which move as the lure is pulled through the water. A simpler, but more cumbersome, resonating system is disclosed by U.S. Pat. No. Des. 349,941 to Gentry, issued Aug. 23, 1994. However, both of these resonating systems may collect vegetation, such as weeds, algae and moss, as neither system is streamlined. The collection of vegetation, such as weeds, algae and moss, causes the fishing line to twist as the swivel is unable to rotate. When the fishing line becomes twisted, the line strength (line test) is weakened and breaks more easily.

Another problem encountered in fishing is providing a sufficient sinker or weight which will allow the fishing lure to drop to the desired depth. As with the resonating system, the sinker is susceptible to the accumulation of vegetation. A streamlined sinker is disclosed in U.S. Pat. No. 4,145,833 to Ratte, issued Mar. 27, 1979 which is oblong in shape and thus avoids the accumulation of vegetation; however, this sinker does not produce a resonating sound that attracts fish.

Another problem encountered in fishing is that the lure itself twists and turns frequently as it passes through and becomes entangled in vegetation, such as weeds, algae and moss. Similarly, the swivel, which attaches the fishing lure to the fishing line for the purpose of preventing line-twist, may also become entangled in the vegetation, thereby defeating the purpose of conventional weed guards, which are designed to protect the fishing lure but leave the swivel exposed, leading to malfunction of the swivel.

Weed guard systems that protect the swivel are known; for example, U.S. Pat. No. 4,920,685 to Landuydt, issued May 1, 1990, discloses a cone-shaped cover which is slid along the fishing line, adjacent the swivel, and thus partially prevents the collection of vegetation on the swivel. However, the Landuydt swivel guard only abuts the swivel and does not enclose the swivel. Therefore, the Landuydt reference only deflects vegetation such as weeds, algae and moss from the front of the swivel but does not protect the exposed length of the swivel. Furthermore, the Landuydt reference does not create a resonating sound which attracts fish.

Therefore, although all of the references discussed solve an individual problem encountered in fishing, none of the devices disclose a streamlined weed guard and resonating system in combination. To solve these problems using the prior art requires three separate components, which is undesirable as excess components increase the complexity of the system and as a result, increase the cost.

Thus, what is needed is a streamlined weed guard resonating system for a fishing lure having a cone which prevents vegetation, such as weeds, algae and moss, from accumulating on the swivel and lure, thus allowing the swivel to function properly, produces a substantially constant first resonating sound upon engagement with the swivel and also produces a second resonating sound upon impact with the sinker, wherein the system is relatively simple and inexpensive.

SUMMARY OF THE INVENTION

Accordingly, it is an object of the present invention to provide an improved weed guard resonating system for a fishing lure.

In carrying out the above and other objects of the invention in one form, there is provided a weed guard resonating system for a fishing lure attached to a fishing line by a swivel, having a cone for slidably engaging the fishing line and substantially enclosing the swivel, thereby protecting the swivel from vegetation, which causes line-twist by immobilizing the swivel, and producing a first resonating sound to attract fish. In an alternate embodiment, the system includes a sinker for slidably engaging the fishing line, adjacent the cone and opposite the swivel, for intermittently engaging the cone to produce a second resonating sound upon impact, as the lure is pulled through the water.

DETAILED DESCRIPTION OF THE INVENTION

Figure 1:
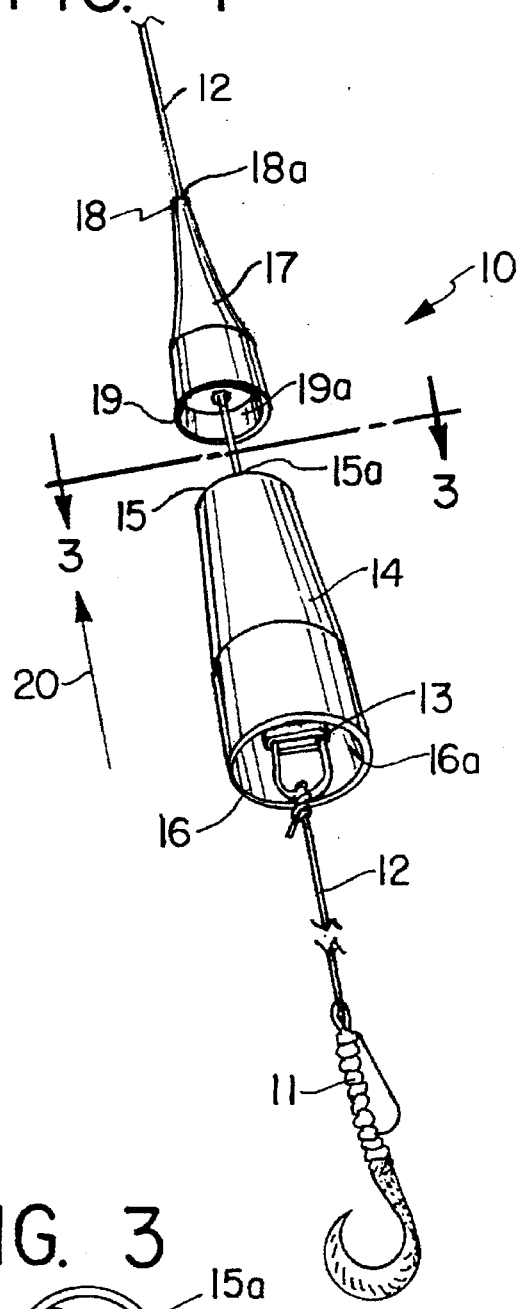
FIG. 1 is a perspective view of the preferred weed guard resonating system for a fishing lure according to the present invention which includes the sinker.
Figure 2:
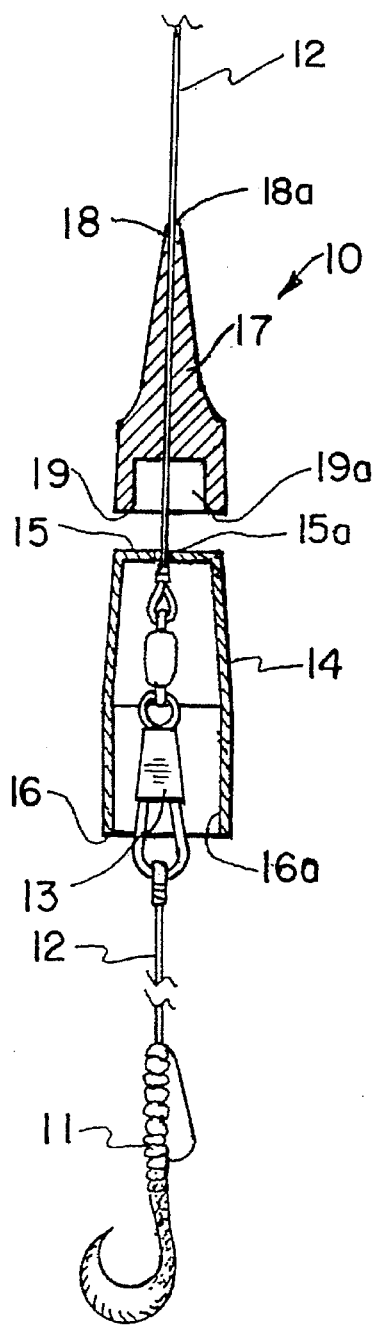
FIG. 2 is a cross sectional view of the preferred weed guard resonating system along line II—II of FIG. 1 according to the present invention.
Figure 3:
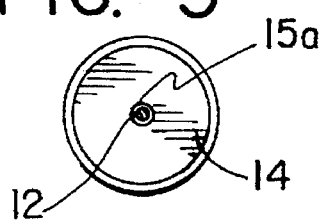
FIG. 3 is a top view of the cone along line III—III of FIG. 1 according to the present invention.

Referring to FIGS. 1–3, a preferred weed guard resonating system 10 for a fishing lure 11, connected to a fishing line 12 by a swivel 13, is shown in accordance with the present invention. The system 10 comprises a dual-function cone 14 which engages the fishing line 12 to substantially enclose the swivel 13, thereby protecting the swivel 13 from vegetation, such as weeds, algae and moss, and producing a substantially constant first resonating ("rattling") sound within the cone 14 from engagement with the swivel 13. In an alternate embodiment, a sinker 17 also engages the fishing line 12, adjacent the cone 14 and opposite the swivel 13, such that the sinker 17 intermittently engages the cone 14 to produce a second resonating ("klunking") sound upon impact, as the lure 11 is pulled through the water. The cone 14 will also produce a klinking sound upon impact with other objects such as rocks, timber and tree stumps. Furthermore, the cone 14 will produce a resonating sound due to the force of the water against the cone 14 as the cone 14 is pulled through the water.

The cone 14 has a streamlined cone-shape and comprises first and second ends 15, 16. The first end has an entrance 15a for insertion of the fishing line 12 and extends through the cone 14 while the second end has a cavity 16a. The entrance 15a is substantially smaller than cavity 16a and is preferably 1/32 inch in diameter while the fishing line 12 is also approximately 1/32 inch in diameter. Since the entrance 15a and the fishing line 12 are a virtual "line-to-line" fit, the cone 14 will remain substantially stationary after placement. Thus, when the cone 14 is positioned on the fishing line 12, the cavity 16a formed by the second end 16 will substantially enclose the swivel 13. However, the swivel 13 is larger than the entrance 15a; therefore, the first end 15 which forms the entrance 15a prevents the swivel 13 from sliding through the entrance 15a as the lure 11 is pulled through the water. As a result, the swivel 13 is completely protected, thus eliminating line twist, and the fishing lure at least partially protected, from engagement with vegetation and other objects.

When vegetation, such as weeds, algae and moss, collects on the swivel 13, the swivel will become immobilized and cease to rotate. The primary function of the swivel 13 is to prevent the fishing line 12 from twisting as the twisting weakens the fishing line 12 strength and breakage and line tangle occurs. Therefore, the cone 14 prevents vegetation from collecting on the swivel 13 which ensures that the fishing line 12 and lure 11 assembly function properly by allowing the swivel 13 to rotate freely.

By redesigning the cone 14 to have a larger opening at the second end 16, greater protection can be provided for the lure 11, if desired. The cone 14 may comprise a variety of configurations and materials without deviating from the intent of the invention; however, the cone 14 is preferably plastic, configured to primarily provide protection to the swivel 13 and produce a first resonating sound upon engagement with the swivel and a second resonating sound upon impact with the sinker 17.

In an alternate embodiment, the dual-function sinker 17 is provided to produce a second resonating sound upon engagement with the cone 14 and also to provide sufficient weight to allow the lure 11 to drop to the desired depth. Like the cone 14, the sinker 17 also has a streamlined cone-shape and comprises first and second ends 18, 19. The first end 18 has an entrance 18a for insertion of the fishing line 12 and extends throughout the sinker 17 while the second end 19 has a cavity 19a. The entrance 18a is substantially smaller than the cavity 19a. Thus, when the sinker 17 is positioned on the fishing line 12, the first end 15 of the cone 14 will engage the cavity 19a of the sinker 17. This engagement of the cone 14 and sinker 17 increases the streamlined effect of the system 10 as the outer diameter of the sinker's second end 19 is at least the size of the outer diameter of the cone's first end 15. The diameter of the entrance 18a of the sinker 17 is larger than the diameter of the fishing line 12, so that the sinker 17 moves freely on the fishing line 12, unlike the cone 14 which is substantially stationary.

Preferably, the sinker 17 also serves as a weight for the lure, so that conventional weights are unnecessary and the overall system is simplified. The sinker 17 may comprise a variety of materials and configurations without deviating from the intent of the invention; however, the sinker 17 preferably comprises a common lead material. In an alternate embodiment, the sinker could be substantially solid by eliminating the cavity 19a while extending the entrance 18a throughout the sinker 17.

In operation, the sinker 17 and the cone 14, respectively, are positioned along the fishing line 12, after which the swivel 13 is attached to the fishing line 12. A lure 11 is attached to the swivel 13 and the cone 14 and sinker 17 are slid towards the lure 11 as shown in FIGS. 1 and 2. As the lure 11 is pulled through the water in a direction 20, as is typical during fishing using artificial lures, the drag coefficient of the water will force the cone 14 towards the lure 11 and against the swivel 13. The swivel 13 will engage the first end 15 at the entrance 15a of the cone 14 and prevent the swivel 13 from sliding through the entrance 15a. As the first end 15 engages the swivel 13 at the entrance 15a, the swivel 13 will become substantially enclosed by the cone 14 within the cavity 16a, thus preventing vegetation, such as weeds, algae and moss, from accumulating on the swivel 13. Preventing vegetation from collecting on the swivel allows the swivel 13 to rotate more freely than without the protection provided by the cone 14 thus eliminating line-twist which substantially weakens the strength of the fishing line,as measured by the actual rated line pound test. For example, a ten pound test line upon becoming twisted will break below the ten pound rated strength. The Sag coefficient of the water will also force the sinker 17 towards the lure 11, thus intermittently engaging the cone 14. As the lure 11 is pulled through the water in the typical fishing manner, the first end 15 of the cone 14 will intermittently engage the second end 19 of the sinker 17, thus creating the second resonating sound which attracts fish.

The force and frequency of the engagement of the sinker 17 and the cone 14 will vary depending on the variation of the speed in which the lure is pulled through the water. For example, the sinker 17 and cone 14 will separate when the lure 11 is initially cast into the water since the sinker 17 moves freely on the fishing line 12. As the lure is pulled or "reeled" towards the fishing reel (not shown), the sinker 17 will engage the cone 14 with a level of force proportionate to the force of the pull due to the water's coefficient of drag, thus producing the "klunking" sound from the engagement of the sinker 17 and the cone 14 while the swivel 13 simultaneously produces a substantially constant "rattling" sound within the cone 14. If the force of the pull remains constant, the cone 14 and sinker 17 will remain engaged and the only sound produced will be the "rattling" sound between the cone 14 and swivel 13. However, if the force of the pull on the fishing line is varied and eratic, the sinker 17 will repeatedly engage the cone 14, thus producing a resulting "klunking" sound, the frequency of which depends on the variance of the speed.

The cone 14 and the sinker 17 each perform a dual-function in the preferred embodiment of the weed guard resonating system 10. When used in the preferred embodiment, the cone 14 substantially encloses the swivel 13 which functions both as a weed guard for the swivel 13 and as a part of the resonating system by producing a substantially constant "rattling" sound within the cone 14. In the alternate embodiment, the sinker 17 functions both as a weight and as another part of the resonating system by producing an intermittent "klunking" sound upon engagement with the cone 14. Thus, in the preferred embodiment, the one-component cone 14 system replaces conventional two-component systems utilized to provide a weed guard and resonating system. Thus, the preferred one-component cone 14 system is extremely simple and inexpensive when compared to conventional two-component weed guard resonating systems.

In the alternate embodiment, the cone 14 and the sinker 17 replace conventional three-component systems utilized to provide a weed guard, sinker and resonating system. Thus, the alternate two-component cone 14 and sinker 17 system is also relatively simple and inexpensive as compared to conventional three-component weed guard, sinker and resonating systems.

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A weed guard resonating system for a fishing lure attached to a fishing line, comprising:

a swivel for connecting the fishing lure to the fishing line;

a circular cone having first and second ends for slidably engaging the fishing line to substantially enclose said swivel, thereby protecting said swivel from vegetation and producing a first resonating sound with said swivel; and a sinker having first and second ends for slidably engaging the fishing line, said sinker positioned adjacent and intermittently engaging said cone, opposite said swivel, for producing a second resonating sound upon impact with said cone.

2. The weed guard resonating system of claim 1, wherein said first end of said sinker is substantially smaller than said second end of said sinker.

3. The weed guard resonating system of claim 1, wherein said second end of said sinker is positioned adjacent said first end of said cone.

4. The weed guard resonating system of claim 1, wherein said second end of said sinker is at least substantially equal in diameter to said first end of said cone.

5. A weed guard resonating system for a fishing lure attached to a fishing line by a swivel, comprising:

a cone slidably engaging the fishing line and positioned adjacent the swivel, thereby protecting the swivel from vegetation and producing a first resonating sound with the swivel; and a sinker slidably engaging the fishing line and positioned adjacent said cone, opposite the swivel, for intermittently engaging said cone during movement to produce a second resonating sound upon impact with said cone.

6. The weed guard resonating system of claim 5, wherein said cone has first and second ends, and said first end of said cone is substantially smaller than said second end.

7. The weed guard resonating system of claim 5, wherein said sinker has first and second ends, and said first end of said sinker is substantially smaller than said second end.

8. The weed guard resonating system of claim 7, wherein said second end of said sinker is positioned adjacent said first end of said cone.

9. The weed guard resonating system of claim 7, wherein the diameter of said second end of said sinker is at least substantially equal to the diameter of said first end of said cone.

10. The weed guard resonating system of claim 5, wherein said cone has an entrance at said first end and a cavity at said second end, and said entrance is substantially smaller than said cavity.

11. The weed guard resonating system of claim 10, wherein said first end of said cone engages the swivel at said entrance when said cavity substantially encloses the swivel.

12. The weed guard resonating system of claim 5, wherein said first resonating sound is a substantially constant rattling sound.

* * * * *

UNITED STATES PATENT AND TRADEMARK OFFICE
CERTIFICATE OF CORRECTION

PATENT NO. : 5,661,922
DATED : Sep. 2, 1997
INVENTOR(S) : Bonomo

It is certified that error appears in the above-identified patent and that said Letters Patent is hereby corrected as shown below:

col. 2, line 42, delete "along line II-II of FIG. 1"

col. 2, line 44, delete "III-III" and insert -- 3-3 --.

Signed and Sealed this

Ninth Day of March, 1999

Attest:

Q. TODD DICKINSON

Attesting Officer

Acting Commissioner of Patents and Trademarks